Sept. 17, 1940.  H. F. HAGEMEYER  2,214,998
MOLD EXTRACTOR
Filed June 11, 1938  2 Sheets-Sheet 2
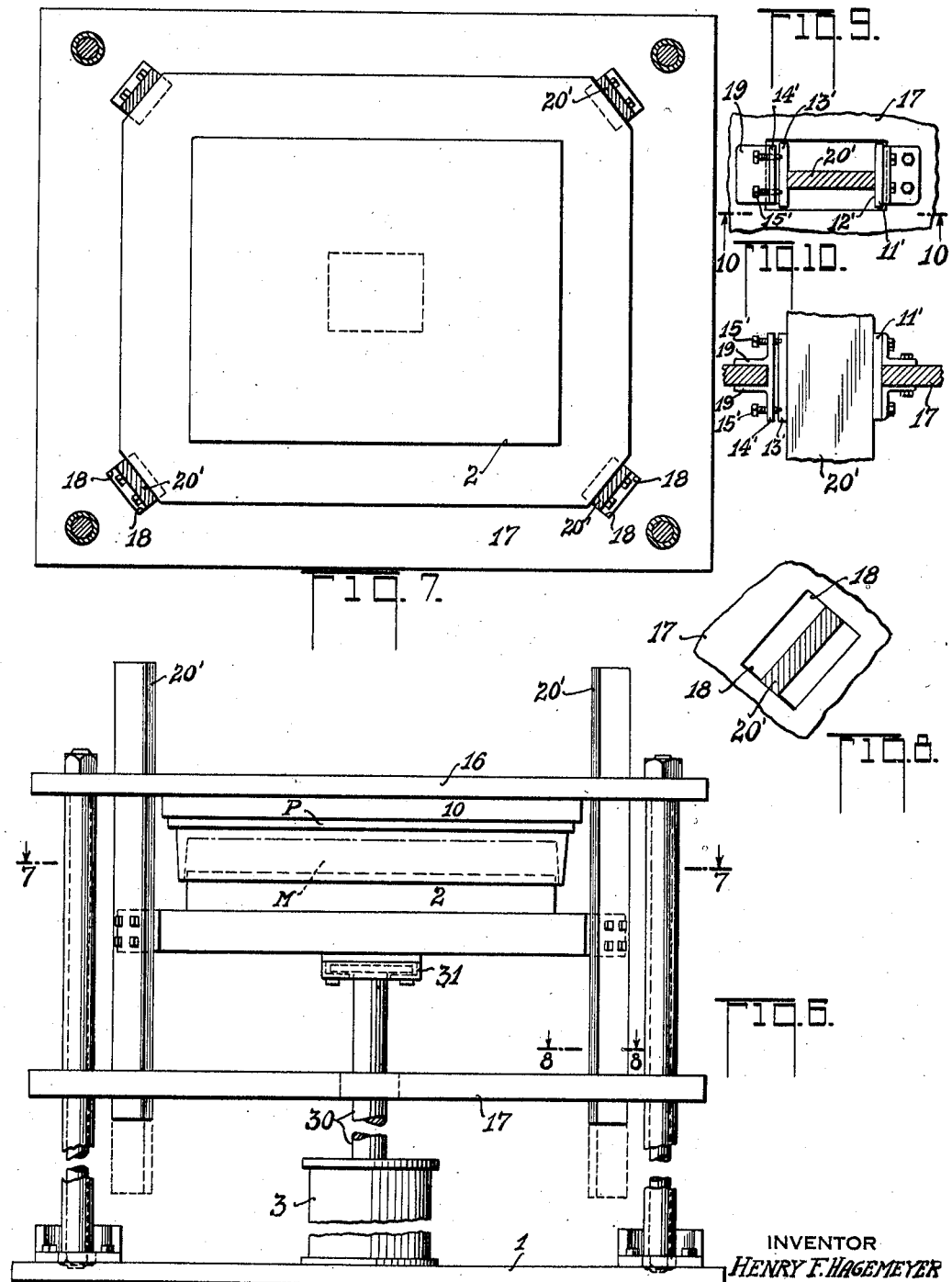
INVENTOR
HENRY F. HAGEMEYER
BY
Robert W. Beach
ATTORNEY Patented Sept. 17, 1940

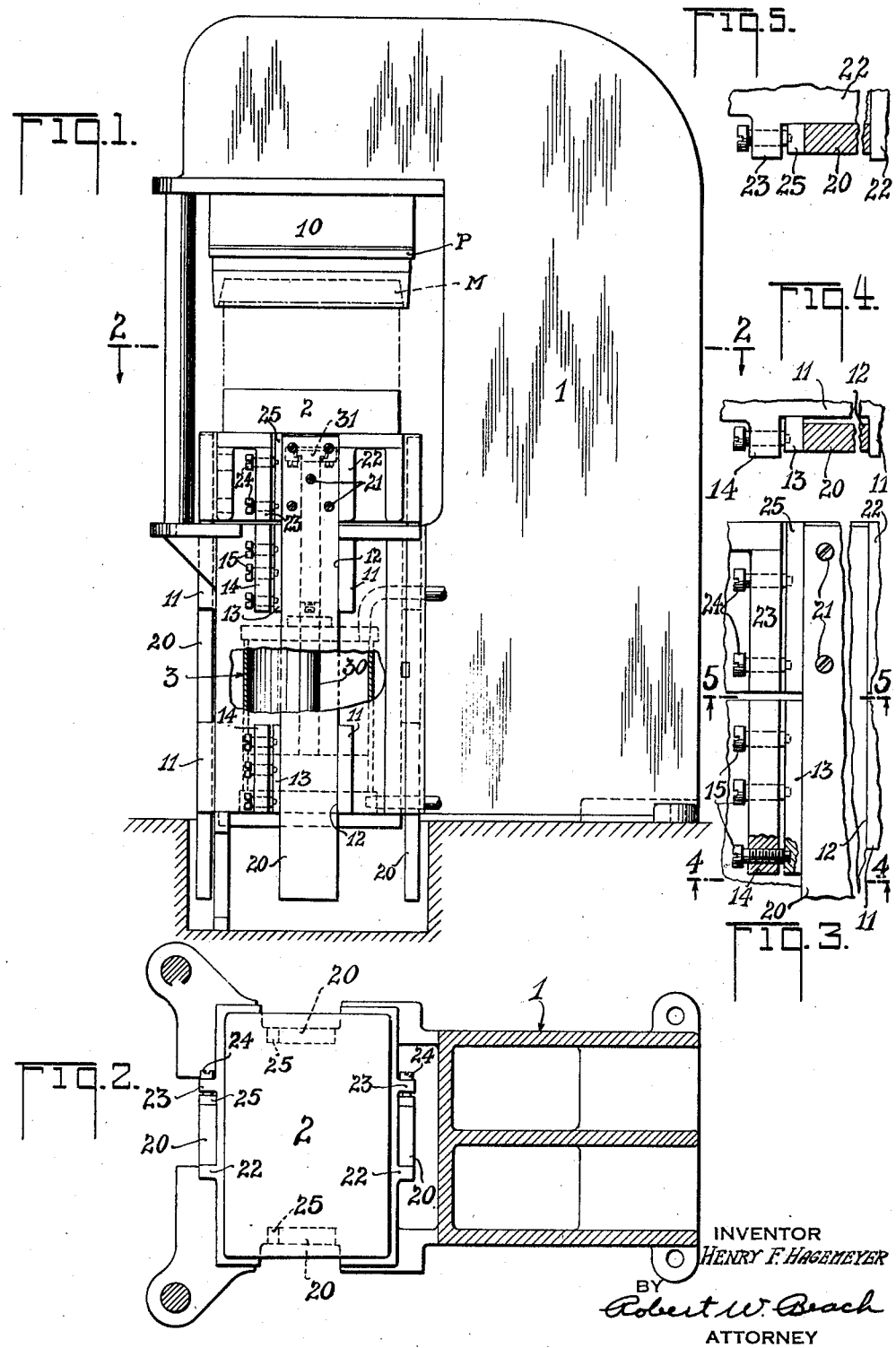

2,214,998

UNITED STATES PATENT OFFICE 2,214,998

MOLD EXTRACTOR

Henry F. Hagemeyer, Chicago, Ill., assignor to Castings Patent Corporation, a corporation of Illinois Application June 11, 1938, Serial No. 213,165

2 Claims. (Cl. 22—47)

This invention pertains particularly to guide mechanism for mold extracting apparatus, and more specifically to such guide mechanism for guiding a head reciprocable to extract a mold for use in metal casting from an integral marginal flask wall and pattern-bearing matchplate mold form.

My present invention may be considered to be an improvement upon the machine described and claimed in my Patent Re. 21,046 issued April 11, 1939, for Apparatus for producing molds. Such patent shows in general parallel pattern holding and mold holding heads or plates, disposed one above the other, the lower plate being reciprocable toward and from the upper plate. In order to prevent binding and consequent unequal stresses in the mold it is very important that the reciprocating movement of the lower head be precisely linear. To control such movement accurately presents a troublesome problem, however, for the reciprocating movement is rather large, and because of fluctuation in the temperature of the parts it had been considered necessary to leave appreciable play or clearance in the guide mechanism.

I have therefore devised my herein disclosed guide mechanism to afford the requisite precision of operation despite the considerable length of travel and temperature variation caused by operating upon hot molds. The guide mechanism itself relies upon its symmetrical relation with respect to the reciprocating plate or mechanism for its close tolerances, affording precision guiding without binding despite large temperature variations. The guide units, of which there are several, each includes a guide bar and a cooperating channel or ways disposed so that each unit is substantially bisected by a median plane through the reciprocating head or plate, and the ways or channel sides lie preferably one to each side of and parallel to such plane. Thus if the plate is rectangular one unit may be disposed at the center of each plate edge. Sufficient clearance should be left for movement between the bar and ways support of each unit in a direction parallel to such plane to allow for free expansion and contraction of the reciprocable member toward and from its center, but the fit perpendicular to any such plane can be very close, for the plane is neutral for lateral expansion and lateral expansive movement progressively increases with relation to such plane for locations farther and farther removed from such plane.

My main object, therefore, is to provide accurate guide mechanism for a reciprocable plate or head in mold extracting apparatus, the accuracy or operability of which is not appreciably adversely affected by large fluctuations in temperature of the reciprocable head and guide mechanism.

A further object is to provide such guide mechanism which is of simple construction, which does not include delicate or fragile parts, and which can be accurately made without resorting to intricate types of machining operations.

Another object is to provide regulating means for such mechanism to increase further the precision of its operation without increasing correspondingly the requisite precision of the fabricating operations.

Additional objects, arising from the utilization of my novel guide mechanism in mold extractors will be disclosed hereafter, it being borne in mind that such guide mechanism may be embodied in mold extractors in various ways which will occur to those working in this art, the particular embodiments herein shown and described being merely illustrative.

Fig. 1 is a side elevation view of my device.

Fig. 2 is a transverse section taken along line 2—2 of Fig. 1.

Fig. 3 is a fragmentary elevation view showing a detail of my device.

Fig. 4 is a fragmentary transverse section taken along line 4—4 of Fig. 3, and

Fig. 5 is a fragmentary transverse section taken along line 5—5 of Fig. 3.

Fig. 6 is a front elevation view of a different form of my device.

Fig. 7 is a transverse section taken along line 7—7 of Fig. 6.

Fig. 8 is a fragmentary transverse section of guide mechanism taken along line 8—8 of Fig. 6.

Fig. 9 is a fragmentary transverse section similar to Fig. 8 of a modified form of guide mechanism, and Fig. 10 is a fragmentary section taken along line 10—10 of Fig. 9.

The essential features of the mold extracting device is a supporting frame 1, illustrated in Figs. 1 and 2 as being of the C-frame type, which carries a fixed head 10, and a movable head 2 which is reciprocable toward and away from the fixed head. The frame 1 should have its head, base and column of integral construction, and the sides of its head and base opposite such column should be connected together by stray bolts so that an exceedingly rigid construction will be obtained. Such rigidity is necessary to insure that the reciprocable head or plate 2 will be maintained precisely parallel to the fixed head or plate 10 during its movement by guide mechanism to be described hereafter which is anchored to the base of the frame 1.

For the purpose of extracting a mold of plastic material from an integral mold form including a marginal flask wall and a pattern-bearing matchplate, as described in my aforementioned patent, it is immaterial which of the fixed head or the reciprocable head is the mold gripping head and which the pattern gripping head as far as the herein disclosed type of guiding mechanism for the reciprocable head or plate is concerned. A suitable arrangement, however, consists of a magnetic chuck of either the permanent magnet or the electromagnet type forming the fixed head 10 which will grip the metal pattern or match plate P and hold the flask in the inverted position with the gypsum base mold M received therein. The reciprocating plate or head 2 may be a mold gripping vacuum head, of the type disclosed in my said patent, which can grip the mold M with its gripping or working face when the head is in its upper position. As the head 2 is moved downward the mold held thereby will be drawn down from the mold form, out of the flask and away from the pattern-bearing matchplate which is held firmly in fixed position by the head 10, and the mold may then be removed from the head 2.

The guide mechanism for the reciprocable head, with which my present invention is particularly concerned, affords a precisely linear guiding operation which will not warp or bind despite fluctuations in temperature of the reciprocable head. This consideration is important in apparatus of this type which may be used intermittently to extract hot molds. At the initiation of a period of operation the mold extractor is cold. After a few operations contact of the head 2 with the hot molds will heat it and effect expansion thereof. Between periods of operation the head will cool more or less and contract. The base of the machine, however, is not appreciably affected by the hot molds and will maintain an approximately constant temperature and size.

The guide mechanism which I have devised is not adversely affected by the changeable temperature conditions described. The guides for the head 2 of Figs. 1 and 2 includes a plurality of pairs of guide members, one member of each such pair being a guide bar 20 and the other member being a set of ways for such guide bar. Either member of each pair may be carried by the reciprocating head 2 and the other mounted on the frame 1. In the construction illustrated, however, the bars 20 are secured in cantilever fashion to the head 2, perpendicular thereto, and extend only downwardly from such head, that is, projecting only beyond the side thereof opposite its working face. Each bar is preferably of rectangular cross section and must be disposed so that opposite parallel faces thereof are parallel to a median plane of the reciprocable head 2 which passes lengthwise through such bar. Such opposite parallel faces of the bar are the ones which are in guiding contact with the ways, and the other sides of the bar are spaced from the ways' support. With a rectangular head, rectangular guide bars may be disposed one at the center of each side of the head with the edges of each bar parallel to the edges of the head. These guide bars 20 may, of course, be hexagonal or cylindrical bars with flat sides disposed parallel to a median plane of the head, as described, or even cylindrical. Cylindrical bars are less desirable than the other shapes, however, for the planar ways would have a relatively small area of guiding contact with their sides for the size and weight of bar used.

Each set of guide ways for a guide bar has parallel planar surfaces adapted to engage the sides of such bar, and such surfaces are disposed parallel to the median plane of the reciprocable head disposed parallel to its path of movement and which passes lengthwise through the guide bar and between the ways. The ways for the bars 20 of Figs. 1 to 4 are the side faces of channels 11 formed on the base 1. In order to provide a long bearing for each guide bar without excessive friction two longitudinally spaced channel ways are preferably provided. It would be possible to machine the side or guiding faces of the channels planar, parallel, and spaced apart just the distance required to receive the guide bar. Since such precision machining is very difficult, however, I prefer to form one guiding side face of each channel as a reference surface 12. The reference surfaces of the upper and lower guide channels for each bar should be coplanar, and the reference faces of all ways which are parallel to the same median plane of the reciprocable head should likewise be coplanar. Thus the sets of ways for guide bars secured to opposite sides of the reciprocable head will have all their reference surfaces, one of each set of ways, disposed in coplanar relationship parallel to a median plane of the reciprocable head passing lengthwise through such guide bars.

Each set of ways will have its reference surface 12 in guiding engagement with one side of a guide bar 20. The other planar bar engaging guide surface of the ways will be formed on a block 13 disposed parallel to the guide bar with its guiding surface generally parallel to the reference surface 12. Means are provided for moving each block 13 toward and away from its reference surface 12 and for adjusting its angularity with respect to such surface, to dispose the two bar engaging guide surfaces in precise parallelism and spaced apart sufficiently to engage snugly the opposite sides of the bar. The mechanism shown includes a fixed flange 14 generally parallel to the reference surface 12 which has several threaded holes extending therethrough perpendicular to the surface 12. Through these holes are threaded machine screws 15 which have reduced tips received in sockets in the blocks 13, as shown in Fig. 3. At least two and preferably three screws are engaged with each block 13 to enable the angularity of the blocks to be adjusted by differential movement of the screws. The engagement of the screw tips in the sockets of the blocks holds them from lengthwise movement when they are in guiding engagement with the bars 20.

The guide bars 20 may be secured to the reciprocable head 2 by any means which will locate them accurately and maintain them precisely parallel to the direction of movement of the reciprocating head. These bars must in addition have one side in proper guiding engagement with the fixed reference surfaces 12 of the upper and lower guide ways. For securing the bars 20 approximately in position, screws 21 passing through them into the head 2 are provided. Because of the precision of the linear movement required, however, further gripping and aligning means may be employed to advantage. These consist of a fixed flange 22 alongside the bar 20 which is machined precisely parallel to the direction of movement of the head 2, and located on the side of the head in position such that when it is engaged with a bar 20 such bar will also be engaged with its reference surface or surfaces 12. On the other side of the bar 20 is provided a flange 23 generally parallel to the flange 22, and provided with tapped apertures to receive screws 24 which engage a movable block 25 for pressing the bar into firm engagement with the flange 22.

With the mechanism described, as the head 2 expands the bars 20 will move directly away from the center. Since the guided sides of each bar and its ways are all parallel to a median plane of the head which passes lengthwise substantially through the center of the bar and midway between the ways, the lateral movement of the bar by expansion of the head will be entirely parallel to the ways. Hence there will be no tendency of the bar to move in a direction perpendicular to the ways, so that the pressure between the bar and the ways will remain the same and no binding will result. Sufficient clearance is left between the base and the sides of each bar not in contact with the ways so that such lateral movement is unrestricted. It will be evident, therefore, that considerable fluctuation in temperature of the head 2 will not cause appreciable binding or inaccuracies of the guiding mechanism.

While the cantilever type of guiding mechanism shown in Figs. 1 and 2 is illustrated as having a guide bar at the center of each edge of the rectangular head, such disposition is not essential provided that the ways, wherever they may be, are disposed parallel to a median plane of the head which passes between the ways. Moreover, a cantilever guide bar is not necessary. Thus in the modified form illustrated in Figs. 6 and 7 the base 1 has a fixed upper head 10 and a reciprocable lower head 2 which carries guide bars 20' perpendicular thereto and extending substantially equal distances above and below such head. Each of these bars, while secured to a corner of the head 2, is nevertheless disposed so that its guided sides are parallel to a median plane of the head which passes lengthwise through such bar. Likewise the ways, which may merely be the sides 18 of apertures in the fixed parallel plates 16 and 17, are disposed parallel to such median plane. These apertures are sufficiently large that the bars 20' can move freely outward in a lateral direction as the head 2 expands, sliding along the ways 18.

For obtaining better accuracy of spacing and parallelism of the ways, adjusting mechanism similar to that previously described may be provided. A fixed block 11' having a reference surface 12' may be secured at one side of the aperture as shown in Figs. 9 and 10. The other side of each bar 20' is engaged by a bar 13' which may be adjusted angularly as well as toward and away from the reference guiding surface 12' by screws 15' threaded in tapped holes in a flanged block 14' having parallel flanges 19 perpendicular to the block and spaced apart sufficiently to receive therebetween the edge of plate 16 or 17 at the aperture therein through which bars 20' and blocks 11', 13' and 14' extend.

Suitable means for effecting reciprocation of the head 2 will be provided, such as a fluid pressure cylinder 3 in which a piston to move a rod 30 is received. This rod is connected to head 2 by a connection 31 which preferably has a small amount of play so that if the connection is not quite true the head 2 will be guided by the herein described guide bars and ways rather than by the rod 30.

In the guiding operation where the bars 20 or 20' are carried by the reciprocable head, it will be seen that each bar acts as a beam, restraining deflection of such head in a plane defined by the edges of the beam contacting the ways. The bars act most efficiently as beams, of course, when their wider dimension is perpendicular to the ways. The friction between the bars and the ways, and consequently the driving power required, are also reduced to a minimum by such disposition. The adjusting mechanism for varying the spacing of the ways enables the proper engagement of the bars for accurate guiding action accompanied by the least friction. Such adjustment also allows the ways to be reset from time to time to compensate for wear on the guide bar and the ways.

As my invention, I claim:

1. In a mold extractor, a head reciprocable to extract a mold from a pattern, a rectangular guide bar of greater width than thickness secured to each corner of the reciprocable head, projecting above and below such head parallel to its direction of movement, and with the opposite narrower sides of each bar parallel to a median plane of the reciprocable head which passes lengthwise through such bar, the broader sides of each bar being perpendicular to its median plane, and two stationary sets of planar parallel ways for each bar, one disposed above and one below said reciprocable head in guiding engagement with only the opposite narrower sides of such bar.

2. In a mold extractor, a head reciprocable to extract a mold from a pattern, and means guiding said head for precisely linear, non-tilting reciprocation, including four pairs of cooperating guide members, two of said guide pairs being intersected by a single median plane of said reciprocable head disposed parallel to its direction of movement and the other two guide pairs both being intersected by a second median plane of said reciprocable head disposed parallel to its direction of movement and intersecting said first median plane substantially perpendicularly, one member of each guide pair being a guide bar carried by said reciprocable head and the other member being a stationary set of bar contacting means in guiding engagement with only two opposite sides of said bar and substantially parallel to said median plane of the reciprocable head intersecting its guide pair, which plane passes between said bar contacting means.

HENRY F. HAGEMEYER.